United States Patent
Weber

(10) Patent No.: US 9,440,377 B2
(45) Date of Patent: Sep. 13, 2016

(54) FUNCTIONAL LAMINATE WARP ELIMINATION METHOD

(75) Inventor: John Weber, Southbury, CT (US)

(73) Assignee: ASSA ABLOY AB, Stockholm (SE)

(*) Notice: Subject to any disclaimer, the term of this patent is extended or adjusted under 35 U.S.C. 154(b) by 77 days.

(21) Appl. No.: 14/373,084

(22) PCT Filed: Jan. 25, 2012

(86) PCT No.: PCT/EP2012/051091
§ 371 (c)(1),
(2), (4) Date: Jan. 16, 2015

(87) PCT Pub. No.: WO2013/110325
PCT Pub. Date: Aug. 1, 2013

(65) Prior Publication Data
US 2015/0209980 A1  Jul. 30, 2015

(51) Int. Cl.
*G06K 19/07* (2006.01)
*B29C 35/16* (2006.01)
(Continued)

(52) U.S. Cl.
CPC ............. *B29C 35/16* (2013.01); *B29C 65/022* (2013.01); *B29C 71/009* (2013.01); *B32B 27/302* (2013.01); *B32B 27/304* (2013.01); *B32B 27/36* (2013.01); *B32B 27/365* (2013.01); *B32B 27/40* (2013.01); *B32B 37/0015* (2013.01); *B32B 37/08* (2013.01); *G06K 19/022* (2013.01); *G06K 19/077* (2013.01); *G06K 19/07722* (2013.01); *B29C 2035/1675* (2013.01); *B29K 2027/06* (2013.01); *B29K 2055/02* (2013.01); *B29K 2067/003* (2013.01); *B29K 2069/00* (2013.01); *B29K 2075/00* (2013.01); *B29L 2031/34* (2013.01); *B32B 37/085* (2013.01);

(Continued)

(58) Field of Classification Search
CPC .................................................... G06K 19/077
USPC ........................................................ 235/488
See application file for complete search history.

(56) References Cited

U.S. PATENT DOCUMENTS

| 4,852,358 A | * | 8/1989 | Acharya ................ A23L 3/361 62/374 |
| 6,352,095 B1 | | 3/2002 | Fulmer et al. |

(Continued)

FOREIGN PATENT DOCUMENTS

| CN | 1649743 | 8/2005 |
| EP | 1842689 A2 | 10/2007 |
| EP | 2407317 A1 | 1/2012 |

OTHER PUBLICATIONS

International Search Report prepared by the European Patent Office on Oct. 29, 2012, for International Application No. PCT/EP2012/051091.

(Continued)

*Primary Examiner* — Christle I Marshall
(74) *Attorney, Agent, or Firm* — Sheridan Ross P.C.

(57) ABSTRACT

The present invention relates to a method and a device for rapidly stress relieving laminated RFID cards sheets (1) or individually cut cards (2) so that the effect of card wrap, bending and distortion is reduced. A freezer tunnel (5) is located down-stream of a laminator machine. The freezer tunnel (5) uses nozzles (8) to supply a cryogenic liquid in vaporized form. Laminated RFID card sheets (1) are transported through the freezer tunnel (5), where they are exposed to an ambient temperature between −40° C. to −100° C. during two minutes or less.

20 Claims, 4 Drawing Sheets

(51) Int. Cl.
  *G06K 19/077* (2006.01)
  *B32B 37/00* (2006.01)
  *B32B 37/08* (2006.01)
  *B29C 65/02* (2006.01)
  *B29C 71/00* (2006.01)
  *B32B 27/30* (2006.01)
  *B32B 27/36* (2006.01)
  *B32B 27/40* (2006.01)
  *G06K 19/02* (2006.01)
  *B29K 27/06* (2006.01)
  *B29K 55/02* (2006.01)
  *B29K 67/00* (2006.01)
  *B29K 69/00* (2006.01)
  *B29K 75/00* (2006.01)
  *B29L 31/34* (2006.01)

(52) U.S. Cl.
  CPC ........ *B32B2425/00* (2013.01); *B32B 2519/02* (2013.01); *Y10T 428/31507* (2015.04); *Y10T 428/31551* (2015.04); *Y10T 428/31786* (2015.04); *Y10T 428/31935* (2015.04)

(56) References Cited

U.S. PATENT DOCUMENTS

| | | | | |
|---|---|---|---|---|
| 6,409,832 | B2* | 6/2002 | Weigl | B01L 3/50273 117/200 |
| 6,902,904 | B2* | 6/2005 | Cutsforth | C12Q 1/56 435/13 |
| 9,037,080 | B2* | 5/2015 | Bosquet | G06K 19/07739 455/41.1 |
| 2007/0237932 | A1* | 10/2007 | Shvartsman | B32B 27/08 428/204 |
| 2009/0136555 | A1* | 5/2009 | Crowley | A61K 9/006 424/422 |
| 2009/0264385 | A1* | 10/2009 | Crowley | A61K 9/006 514/165 |
| 2011/0117838 | A1* | 5/2011 | Bosquet | G06K 19/07739 455/41.1 |
| 2013/0261262 | A1* | 10/2013 | Cox | G06K 19/07745 525/217 |

OTHER PUBLICATIONS

Official Action with English Translation for China Patent Application No. 2012800678610, dated Jun. 3, 2015, 16 pages.

* cited by examiner

FUNCTIONAL LAMINATE WARP ELIMINATION METHOD

CROSS REFERENCE TO RELATED APPLICATIONS

This application is a national stage application under 35 U.S.C. 371 and claims the benefit of PCT Application No. PCT/EP2012/051091 having an international filing date of Jan. 25, 2012, which designated the United States, the disclosure of which is incorporated herein by reference.

TECHNICAL FIELD

The present invention concerns the production of functional laminate like RFID cards, and more specifically to a method for reducing card bending in card manufacturing process.

The present invention also concerns a device for carrying out the method steps and a product, such as a RFID card, manufactured by the method of the invention.

BACKGROUND ART

Functional laminates are documents resulting from the lamination of a plurality of layers. In particular they are used as security documents such as smart cards, ID cards, passports, credit cards and the like.

Functional laminates don't refer only to functional cards, but also refer to semi-finished products like prelaminates or inlays, which are used for example for the manufacturing of smart cards equipped with functional components such as chips or chip modules, RFID antennae, switches and the like. They usually comprise a number of layers, wherein the chip module is embedded in at least one of the layers. The layers are usually made of a plastic material such as polyvinylchloride, polycarbonate or polyethylene terephthalate. To finalize the card, outer layers with printed letters, numbers, images and patterns are often added to the inlay in a subsequent lamination process. For the purpose of concision, the terms cards or RFID cards will be use in the rest of this description in place of the generic term of functional laminate, all being equivalent in the frame of the present application.

RFID cards are widely used for providing remote identification data over a wireless radio signal and can be used in a wide variety of applications, such as employee ID badges, electronic passports, transit/toll payment cards, etc.

Generally, an RFID card comprises a laminated card body and a set of embedded electronic components. Typically, the laminated materials in the card body comprise layers of various plastic or thermoplastic material, paper, textiles and adhesive, etc.

Basically, RFID cards are produced in a laminator machine, where larger sheets are laminated together by applying pressure and/or heat. The sheets are generally cut into individual cards further down the manufacturing process.

When the layers are laminated using heat and/or pressure the macromolecules of the plastic material tend to shorten thus causing the plastic material to shrink. Since the chip or chip module itself does not shrink, the material is subjected to mechanical stress eventually leading to a deformation, a cracking or a delaminating of the material or at least residual stress which can result in damage to the functional components and their contacting with conductors, wires or antenna loops or in destruction of the plastic material around the functional components. In the case of RFID cards, wherein a large part of the surface body is occupied by the antenna, the inner tensions can often cause card wrap, distortion and bending. It is therefore necessary to stress relieve the cards by an efficient cooling operation so that the card deformation is reduced.

The most common process for stress relieving RFID cards is to place a pile of cards or uncut card sheets in a stationary freezer unit. The card sheets are manually collected as they exit the laminator machine and placed in the freezer unit for 24 hours at a temperature of about −40° C. The card sheets are thereafter manually collected again and re-inserted into the remaining manufacturing process. Alternatively, the card sheets are cut into individual RFID cards before being placed in the freezer.

From a process standpoint, it is inefficient to handle the card sheets several times with a manual operation. Moreover, the long lead time for the freezing operation causes an increased inventory in the manufacturing pipeline slowing the overall manufacturing efficiency.

Furthermore, the large amount of manual labour required results in a higher frequency of lifting injuries and a production bottle neck.

There are numerous methods for reducing card bending, which present combinations of cooling and pressing operations.

EP 1 291 169 shows an example of a laminator equipped with a cooling plate, which is cooperating with a pressing roller to cool off the laminated cards at the output side of the laminator.

Another similar example is presented in U.S. Pat. No. 5,399,223, where a cooling block is simultaneously holding the cards flat and applying a cooling effect.

A further example is presented in U.S. Pat. No. 6,352,095, where a card straightening device in a laminating machine presses a card between two plates and uses a cold air flow from a fan to cool off the card.

JP 7097117 shows a similar method where the card is being held between plates and cooled off by a fan.

SUMMARY OF THE INVENTION

An aim of the present invention is therefore to improve the known manufacturing processes and products obtained therefrom.

Another objective of the present invention is to reduce the occurrences of card warp, distortion, card bending and torque.

A further objective of the present invention is to create an efficient method for stress relieving and card cooling with a shorter lead-time, less manual operations and a reduced amount of inventory in the manufacturing pipeline.

A feature of the present invention is to use a freezer tunnel located downstream of a laminator machine. Laminated RFID cards or card sheets are placed on a conveyor belt and travel through the freezer tunnel where they are exposed to a super coolant such as liquid nitrogen or any other cryogenic gas providing an equivalent effect. The super coolant is supplied in liquid form by nozzles (for example), which are creating a cooling mist within the freezer tunnel. The cards are located in the tunnel typically during two minutes, where they are exposed to a low temperature for example between −40° C. to −100° C.

The method according to the invention uses a flash or rapid freeze effect that reduces the stress release necessary time to minutes. This method is increasing the manufacturing yield, is simplifying greatly the process inventory and is allowing faster delivery to the market. Cryogenic freezer tunnels are well known in the art but are generally used in food processing plants (see manufacturers like Praxair or Air Products).

It is really surprising that such a device can be used for stress release in laminated plastic body. Indeed, the methods of the state of the art were based on the statement that the slower and the longer the release process is, the better the release of the mechanical stress inside of the card body. It is therefore really unexpected that a thermal shock could provide the same effect as a 24 hours cooling for such products.

The method can be applied to any functional laminates with integrated functional elements.

In an embodiment, the invention concerns a method for manufacturing a functional laminate formed by a plurality of layers which are laminated together by use of heat and pressure and by at least one partially embedded functional element, wherein subsequently to a lamination step, the functional laminate is flash freezed with freezing means.

In an embodiment, to be flash freezed, the functional laminate is transported in a freezer tunnel for a couple of minutes, preferably 2 minutes or less.

In an embodiment, the flash freezing temperature is between about −40 and about −100° C.

In an embodiment, the freezing means are a cryogenic gas, such as liquid nitrogen or liquid hydrogen.

In an embodiment, the freezing means is supplied in liquid form by nozzles which create a cooling mist.

In an embodiment, the functional laminate is provided out of the lamination step as a sheet comprising multiple functional laminate placed side by side and that the entire sheet is submitted to the flash freezing step.

In an embodiment, a functional laminate is produced by the method according to the present invention.

In an embodiment, the functional element is a chip or a chip module.

In an embodiment, the functional element is a RFID chip or chip module connected to an antenna.

In an embodiment, the plurality of layers comprises at least a layer made of plastic material, in particular a thermoplastic material.

In an embodiment, the plastic material is one of polycarbonate, polyethylene terephthalate, polyurethane, polyvinylchloride and acrylonitrile butadiene styrene.

DETAILED DESCRIPTION

FIG. 1 shows an overview of the improved process according to the present invention.

Figure 1:
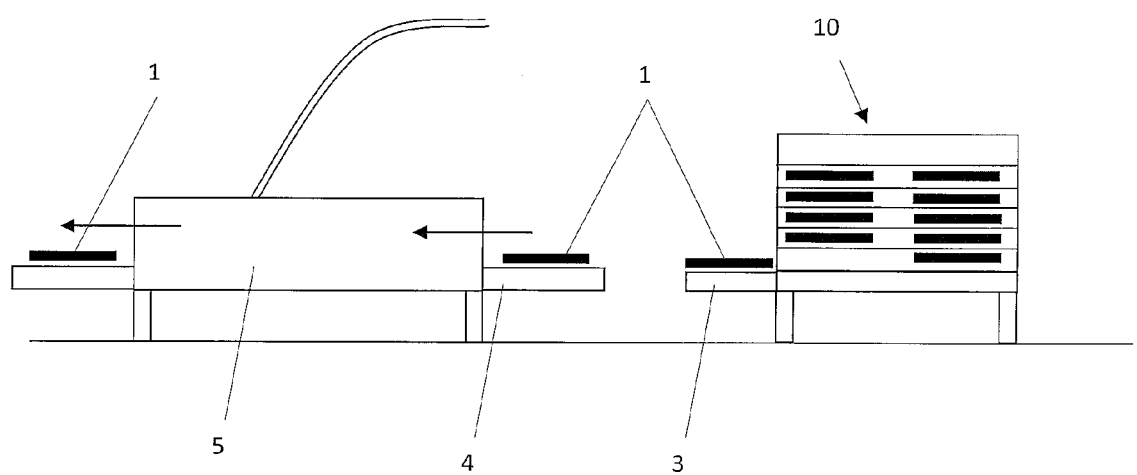
FIG. 1 shows an overview of the cooling process operation

The laminated RFID cards sheets 1 are collected at a laminator 10 outlet 3, directly after the lamination process, and each sheet 1 is subsequently placed individually onto a belt conveyor 4 or another equivalent conveying means. The sheets 1 are transported on the belt conveyor 4 into a freezer tunnel 5, where they are exposed to a super coolant, for example vaporized liquid nitrogen or any other cryogenic gas in accordance with the principle of the present invention. Cryogenic freezer tunnels are well know in the art but are generally used in food processing plants (see manufacturers like Praxair or Air Products).

Typically, the RFID card sheets 1 travel from the entrance to the end of the freezer tunnel 5 in two minutes or even less. At the end of the freezer tunnel 5, the sheets are completely frozen and stress relieved. In FIG. 1, a manual operation is possible for loading the RFID sheets 1 onto the belt conveyor 4, but this operation can be also automated by a transferring device, such as another belt conveyor.

Figure 2:
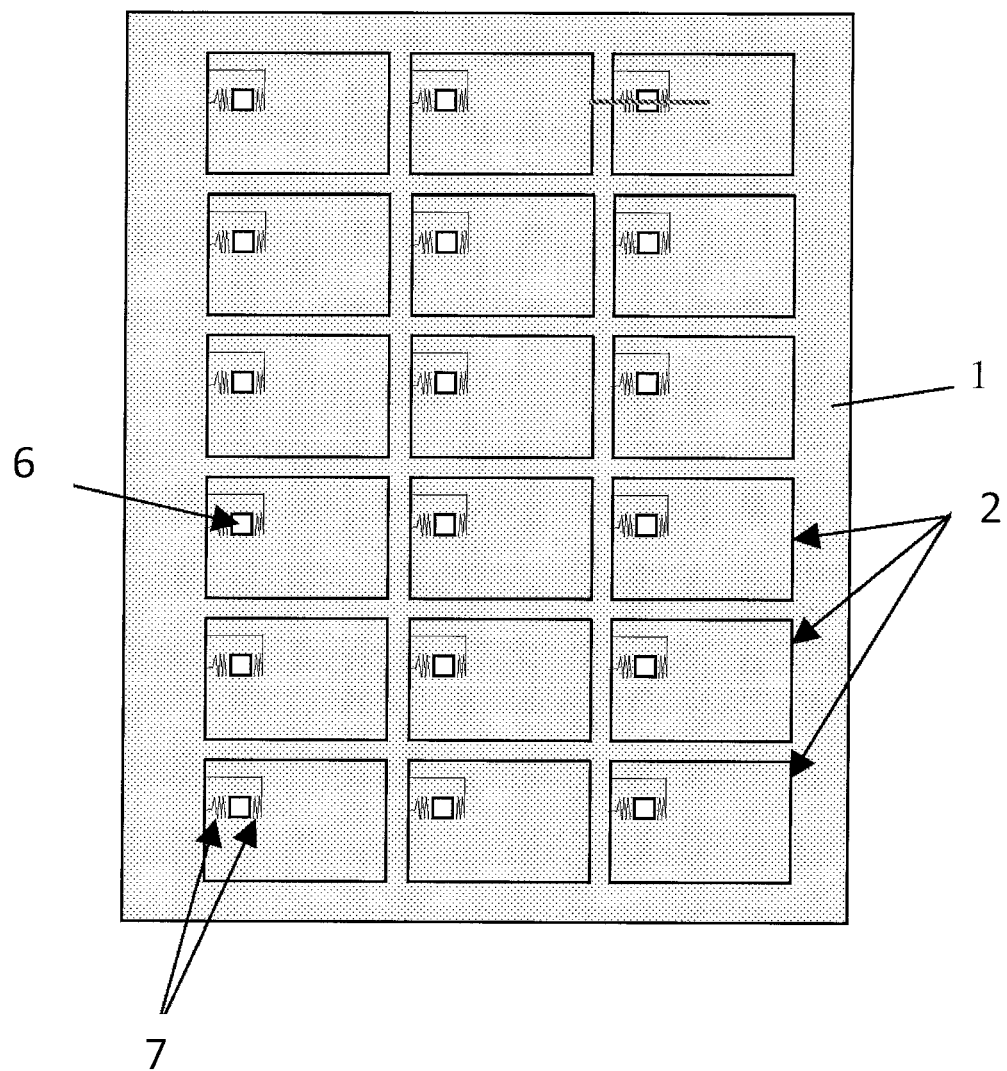
FIG. 2 shows a top view of a RFID card sheet

As illustrated in FIG. 2, the laminated card sheets 1 comprises a group of individual RFID cards 2, which have not yet been individually cut. Each individual RFID card 2 has a set of electronic components, such as an electronic chip module 6 and an embedded antenna 7.

Alternatively, the card sheets 1 can be cut in individual cards before being processed in the freezer. This preferred embodiment has the advantage to improve the exposure of the card material to the cryogenic mist.

Figure 3:
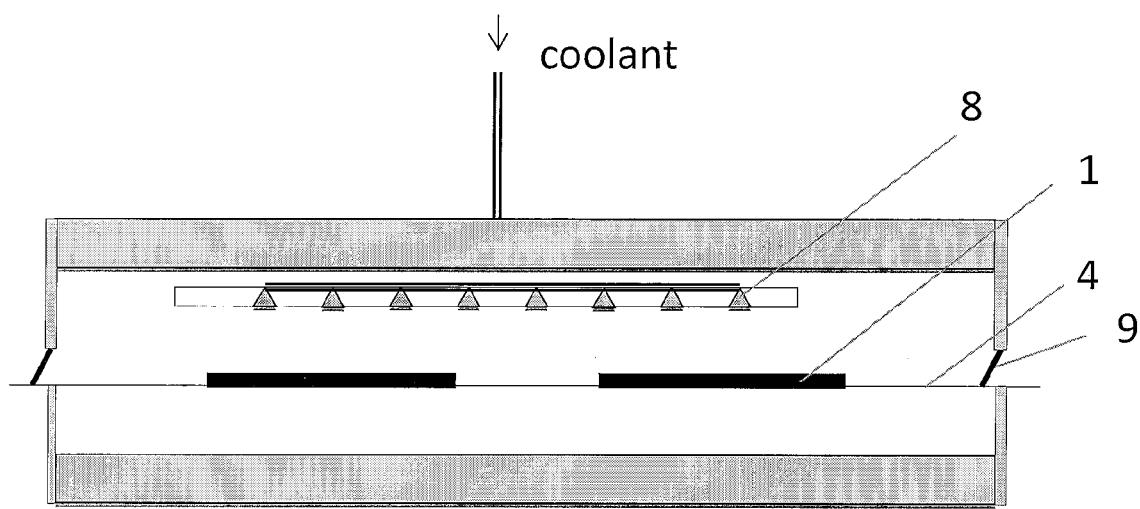
FIG. 3 shows a schematic cross section of the freezer tunnel according to a first embodiment

In FIG. 3, a cross sectional view of the freezer tunnel 5 according to a first embodiment is presented. The card sheets 1 are continuously transported on the belt conveyor 4 and a supply of liquefied coolant is directed through nozzles 8, which spray a mist of cryogenic liquid onto the card surfaces in order to flash cool the sheets 1.

Figure 4:
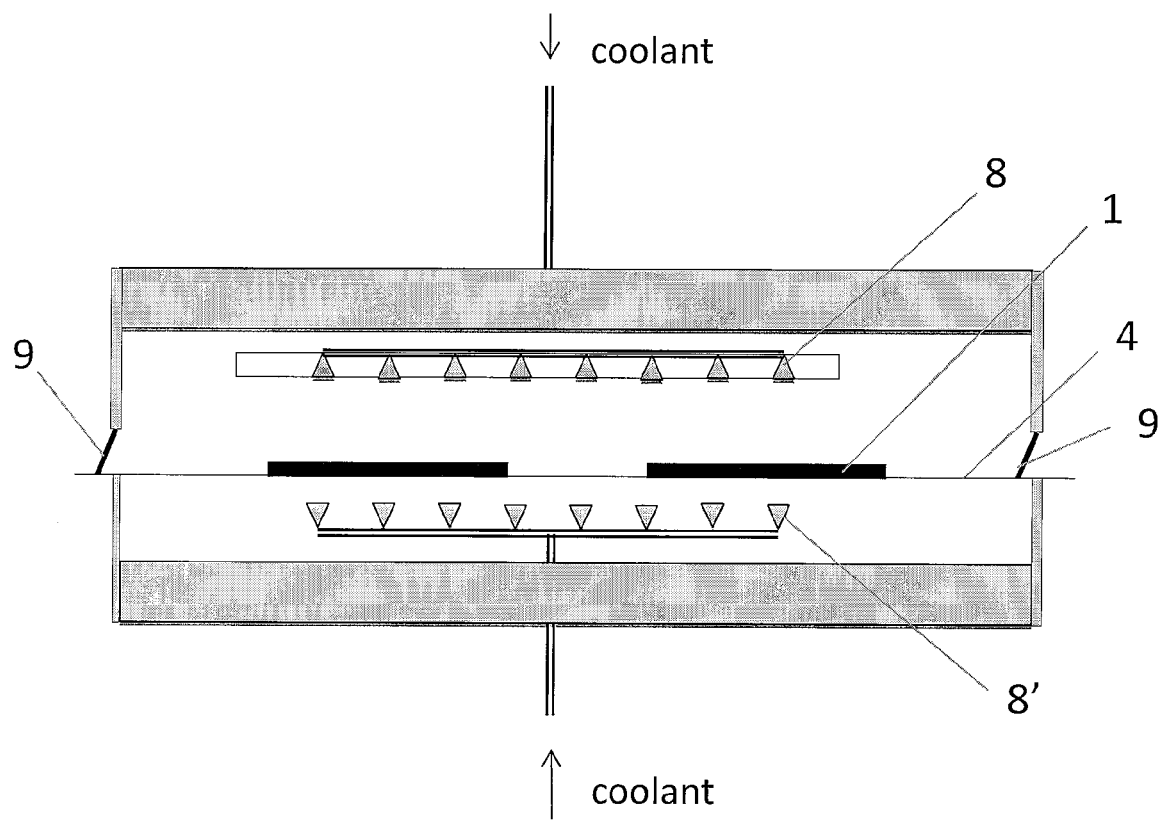
FIG. 4 shows a schematic cross section of the freezer tunnel according to a second embodiment Referring now to the figures.

FIG. 4 shows a cross section according of another embodiment of freezer tunnel 5. In this example, nozzles 8, 8' are located on both sides of the conveyor belt 4. The belt conveyor has apertures for example holes so that the coolant can also access the card surfaces from below through the belt 4.

Also illustrated in FIG. 4 are doors 9 which are present at each side of the freezer and allow maintaining the temperature in the freezer 1.

The examples described herein are only for illustrative purposes and should not be construed in a limiting manner. Other variants may be envisaged using equivalent means.

The invention claimed is:

1. A method for manufacturing a functional laminate formed by a plurality of layers which are laminated together by use of heat and pressure and by at least one partially embedded functional element, characterized in that following a lamination step, the functional laminate is flash frozen by freezing means.

2. The method according to claim 1, wherein to be flash frozen, said functional laminate is put through a freezer tunnel for a couple of minutes, preferably 2 minutes or less.

3. The method of claim 1, wherein the flash freezing temperature is between about −40 and about −100° C.

4. The method of claim 1, wherein the freezing means comprises a cryogenic gas, liquid nitrogen or liquid hydrogen.

5. The method of claim 1, wherein the freezing means is supplied in liquid form by nozzles which create a cooling mist.

6. The method of claim 1, wherein the functional laminate is provided out of the lamination step as a sheet comprising multiple functional laminate placed side by side and that the entire sheet is submitted to the flash freezing step.

7. A functional laminate which is produced by the method according to claim 1.

8. The functional laminate of claim 7, wherein the functional element is a chip or a chip module.

9. The functional laminate according to claim 7, wherein the functional element is a RFID chip or chip module connected to an antenna.

10. The functional laminate according to claim 7, wherein the plurality of layers comprises at least a layer made of plastic material, in particular a thermoplastic material.

11. The functional laminate according to claim 7, wherein the plastic material is one of polycarbonate, polyethylene terephthalate, polyurethane, polyvinylchloride and acrylonitrile butadiene styrene.

12. A method for manufacturing a functional laminate, wherein the functional laminate is formed by a plurality of layers laminated together by use of heat and pressure and by at least one partially embedded functional element, comprising, following a lamination step, subjecting the functional laminate to flash freezing in a freezer tunnel for about a couple of minutes.

13. The method according to claim 12, further comprising subjecting the functional laminate to flash freezing in a freezer tunnel for two minutes or less.

14. The method of claim 12, wherein the flash freezing temperature is between about −40 and about −100° C.

15. The method of claim 12, wherein the flash freezing comprises subjecting the functional laminate to a cryogenic gas or a cryogenic liquid.

16. The method of claim 12, wherein the step of subjecting the functional laminate to flash freezing comprises supplying cryogenic liquid through nozzles to create a mist.

17. The method of claim 12, further comprising subjecting multiple functional laminates to the flash freezing step simultaneously, and wherein at least some of the multiple functional laminates are positioned side by side as part of a single laminate.

18. A functional laminate which is produced by the method according to claim 12.

19. The functional laminate of claim 18, wherein the functional element is a chip or a chip module.

20. The functional laminate according to claim 18, wherein the functional element is a RFID chip or chip module connected to an antenna.

* * * * *